D. C. LOPEZ.
DRAFTSMAN'S PROTRACTOR.
APPLICATION FILED SEPT. 13, 1919. RENEWED JULY 22, 1920.
1,351,527.
Patented Aug. 31, 1920.
2 SHEETS—SHEET 1.
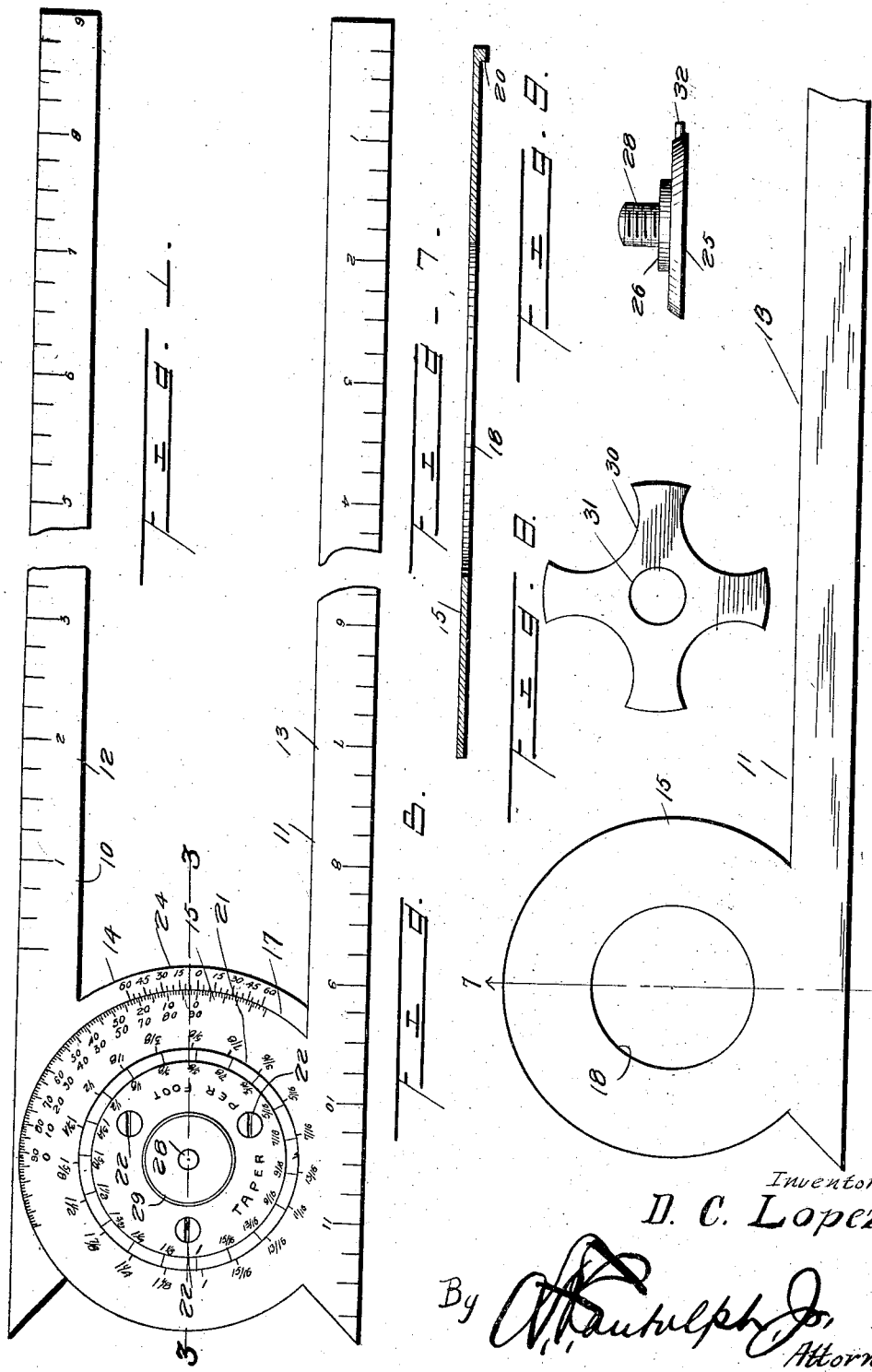
Inventor
D. C. Lopez.
By
Attorney

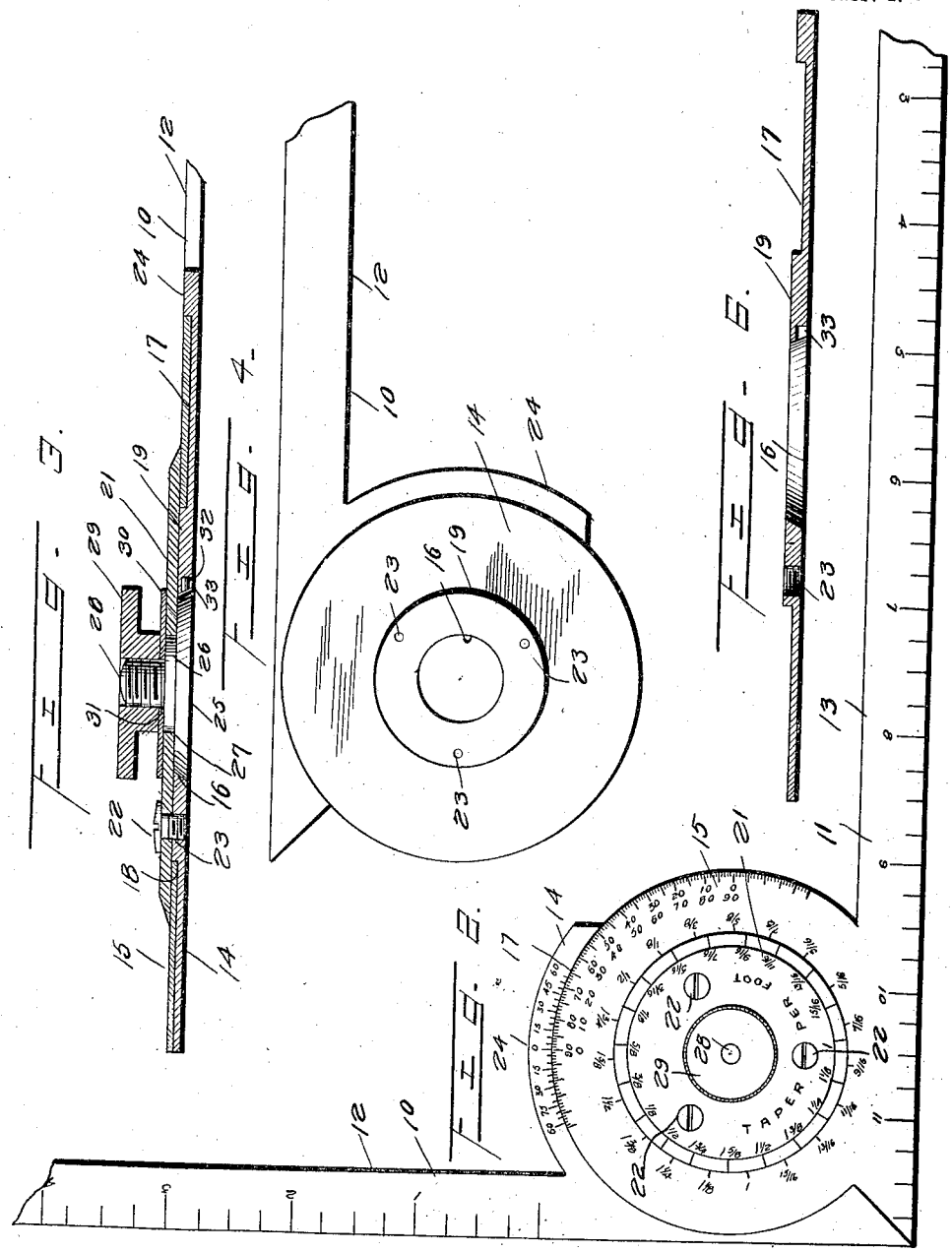

UNITED STATES PATENT OFFICE.

DAVID CABRERA LOPEZ, OF CHICAGO, ILLINOIS.

DRAFTSMAN'S PROTRACTOR.

1,351,527.  Specification of Letters Patent.  Patented Aug. 31, 1920.

Application filed September 13, 1919, Serial No. 323,468. Renewed July 22, 1920. Serial No. 398,285.

*To all whom it may concern:*

Be it known that I, DAVID C. LOPEZ, a citizen of the United States, residing at Chicago, in the county of Cook and State of Illinois, have invented certain new and useful Improvements in Draftsmen's Protractors; and I do hereby declare the following to be a full, clear, and exact description of the invention, such as will enable others skilled in the art to which it appertains to make and use the same.

This invention relates to an improved protractor for use by draftsmen and the principal object of the invention is to provide a protractor so constructed that it may be used in connection with a T-square or ruler and a line drawn at a desired angle and to further so construct this protractor that by use of the same a line may be drawn at an angle which will produce a desired taper or drop per foot.

In machine work it is often necessary to provide a given taper per foot and in architectural work it is often desired to have a floor constructed at an incline or in other words have a drop of a certain amount per foot and with this improved protractor the necessary angle to produce the drop or taper per foot can be easily ascertained.

Another object of the invention is to provide an improved joint construction for pivotally connecting the arms or legs of the protractor, the joint being so constructed that the arms may be easily swung to the desired position and then securely locked in the desired position thus preventing the arms from moving while in use.

Another object of the invention is to so construct this joint that the arms of the protractor may be disconnected when necessary for cleaning and oiling the joint.

Another object of the invention is to so construct the joint that the head of the screw or threaded stem forming the pivot pin will be locked against rotary movement independent of one of the arms and thereby prevented from turning when the securing nut is tightened or loosened.

This improved protractor is illustrated in the accompanying drawings, wherein:

Figure 1 is a top plan view showing the protractor with the arms extending parallel.

Fig. 2 is a view similar to Fig. 1 with the arms extending at right angles to each other.

Fig. 3 is a sectional view through the joint taken along the line 3—3 of Fig. 1.

Fig. 4 is a plan view of one of the sections of the protractor.

Fig. 5 is a plan view of the second section.

Fig. 6 is a sectional view through the head of one of the sections taken along the line 6—6 of Fig. 4.

Fig. 7 is a view similar to Fig. 6 taken along the line 7—7 of Fig. 5.

Fig. 8 is a view of the spring disk which locks the securing nut in place.

Fig. 9 is a side elevation of the pivot bolt.

This improved protractor is provided with two sections indicated in general by the numerals 10 and 11 and provided with arms 12 and 13 which extend from head or joint elements 14 and 15. These heads will be rotatably connected, as hereinafter brought out, thus pivotally mounting the sections and permitting them to be turned to place the arms either parallel, as shown in Fig. 1, or at an angle, the limit of the angle being ninety degrees as shown in Fig. 2.

The section 10 has its head 14 provided with a central opening 16 and has its upper face cut away to provide a circular seat 17 which receives the head 15 of the section 13. This section 13 has its head 15 provided with a central opening 18 through which the neck or bearing 19 of the head 14 passes and has its head reduced as shown in Fig. 7 to provide a depending flange 20 which fits against the edge of the head 14. Therefore, when the heads are connected as shown in Fig. 3, the protractor will have the head or joint portion thereof provided with a flat under face extending in the same plane as the arms thus permitting the protractor to rest flat upon the paper. A disk 21 which serves as a dial is positioned upon the collar 19 and secured thereto by screws or other removable fasteners 22 which pass into threaded openings 23 formed in the collar thereby holding the disk in position to retain the heads in engagement as shown in Fig. 3, but permitting the disk to be removed when it is desired to separate the sections for cleaning. The dial is provided with scale markings, as shown in Figs. 1 and 2, which will coöperate with similar scale markings upon the outer face of the head 15 to indicate taper per foot when the arm 12 is swung from the position shown in Fig. 1 toward that shown in Fig. 2 as will be hereinafter brought out. A scale in degrees is also provided upon the outer face of this head 15 at the edge thereof, as shown in Figs. 1 and 2, and coöperates with a scale marked upon the flange 24 of the head 14 to indicate the angle at which the arm 12 extends in respect to the arm 13, as will be hereinafter brought out.

In order to secure the section of the protractor in a set position with the arm 12 extending at the desired angle to the arm 13, there has been provided a screw which has a head 25, the edge of which is beveled and fits into the under cut opening 16 of the head 14. A neck 26 extends from this head 25 through the opening 27 of the dial 21 and has its upper face flush with the upper face of the dial as shown in Fig. 3. The threaded stem 28 of the securing screw extends upwardly and carries a securing nut 29, a spring washer 30 being placed upon the threaded stem between the nut and dial and serving to lock the nut against accidental turning to release the fastener when the protractor is in use. Normally this spring washer is curved transversely from the outer edge toward the central opening 31 through which the threaded stem 28 passes but when the securing nut is tightened the washer will be flattened as shown in Fig. 3 thereby providing the necessary binding action to lock the nut. In order to prevent the screw from turning in the openings 16 and 27 when the nut is turned to tighten or release the fastener, there has been provided a lug 32 which fits into the offset or pocket 33 of the opening 16. Therefore, the securing nut can easily be tightened or loosened and there will be no danger of the screw turning with the nut thus preventing proper tightening of the nut or making it very difficult to release the nut after it has been tightened.

When in use, the protractor will be first set as desired and will then be placed upon the paper with one of the arms in engagement with the side edge of a T-square blade. A line can therefore be drawn with the second arm used as a ruler and the line will be drawn at the necessary angle to produce the desired taper or drop per foot or at a desired angle up to ninety degrees with respect to a line already drawn. If it is desired to have the line drawn parallel to a given line, the protractor will be set as shown in Fig. 1 with the arms extending parallel, but if it is desired to have this line extend at an angle to the given line, the arm 12 will be swung away from the arm 13 toward the position shown in Fig. 2 until the cipher of the scale upon flange 24 registers with the degree upon the scale at the edge of the head 15 at which it is desired to have the line extend. For instance, if it is desired to have the line at right angles or at ninety degrees to the given line, the arm will be swung to the position shown in Fig. 2 with the cipher registering with the ninety degree mark. The nut will then be tightened and the two sections will be securely held in the desired position. In the same way if it is desired to have one line extend parallel to a line extending at an unknown angle the protractor can be placed upon the paper with the edge of one arm engaging the edge of the T-square which will be positioned to extend across the board. The second arm will then be swung until the edge thereof extends along the line and the securing nut then tightened. The angle of this line will thus be ascertained and a second line parallel to the same can be drawn. When using the device to draw a line which will produce a desired taper per foot or drop in a flooring per foot, the fastener will be released and the arm 12 swung until the corresponding mark upon the dial 21 and inner edge portion of the head 15 register. For instance, if it is desired to produce a line which will give a drop of three-eighths of an inch taper per foot, the arm 12 will be swung until the three-eighths inch mark of the dial registers with the three-eighths inch mark of the head 15. The fastener will then be tightened and the line will be drawn at the right angle. It will thus be seen that there has been provided a protractor so constructed that it can be used either for drawing a line at a given angle to a line already drawn or a line may be drawn at an angle which will give a desired taper or drop in inches or fractions thereof per foot. There has further been provided a protractor which is so constructed that it will rest flat upon the paper and may be very efficiently used in connection with a T-square. It will be further noted that the protractor is so constructed that it can be turned and securely set in the desired position and at the same time the joint may be taken apart thus permitting the sections of the protractor to be disconnected for cleaning and repairing.

What is claimed is:

1. A protractor comprising sections each having an arm, a head carried by each arm, the head of one arm being provided with a central opening undercut and the head being further provided with a circular seat in its upper face positioned about the central opening and in spaced relation thereto to provide a collar about the opening, the head of the second arm fitting into the seat of the first head and provided with a central opening receiving the collar of the first head, a disk secured upon the collar of the first head and providing a dial overlapping the outer face of the second head to rotatably hold the second head in engagement with the first head, said dial being provided with a central opening registering with the central opening of the first head, and said dial being provided with scale markings about its periphery coöperating with corresponding scale markings adjacent the inner edge of the second head and the second head being provided adjacent its outer periphery with scale markings coöperating with the scale markings upon the outer face of the first head, a fastener having a screw provided with a head fitting into the undercut opening of the first head, a collar carried by the head of the screw and fitting into the opening of the dial, a threaded stem extending from the collar, a locking washer upon the threaded stem engaging the disk, and a securing nut screwed upon the threaded stem and engaging the locking washer.

2. A protractor comprising sections each having an arm and a head, the head of one arm being provided with an annular groove in its outer face providing a seat and the head of the second section fitting into the seat of the first head and having a central cut out through which the central portion of the first head passes, a disk connected with the central portion of the first head and extending in overlapping relation to the head of the second section to rotatably connect the head and pivotally mount the sections, a fastener carried by the central portion of the first head and having a threaded stem, a securing nut screwed upon the threaded stem, and a locking washer upon the stem between the securing nut and disk, the fastener when tightened holding the sections against pivotal movement.

3. A protractor having sections each provided with an arm and a head, the head of one section being seated in an annular groove formed in the head of the second section and having its outer face provided adjacent its outer peripheral edge with scale markings in degrees coöperating with the scale markings upon the head of the second section for indicating the angular relation at which one arm extends with respect to the second, a disk connected with the central portion of the second head and overlapping the head of the first section and having scale markings thereon coöperating with scale markings upon the inner peripheral edge portion of the first head to indicate the taper of an object drawn through the medium of the protractor, and means for securing the sections against pivotal movement.

4. A protractor comprising sections each having an arm and a head, the head of one arm having a central opening having an offset forming a pocket, the head of the second arm being positioned in overlapping relation to the head of the first arm, a disk secured to the central portion of the head of the first arm and overlapping the central portion of the head of the second arm and provided with a central opening of less diameter than the opening in the first head, a fastener screw having an enlarged head positioned in the opening of the first head and having a finger extending into the pocket to hold the screw against rotation, a collar extending from the head of the screw through the opening in the disk and provided with a threaded stem extending beyond the outer face of the disk, a locking washer upon the stem engaging the outer face of the disk, and a securing nut screwed upon the stem and engaging the washer, the fastener when tightened drawing the disk into tight engagement with the head of the second section to hold the sections against pivotal movement.

5. A protractor comprising sections each having an arm and a head, the heads being positioned in overlapping relation, a disk carried by one head and engaging the second to rotatably connect the heads and pivotally mount the sections, the head of one section being provided with scale markings coöperating with scale markings upon the dial and the head of the second section to indicate the angle or pitch of a line drawn through the medium of the protractor, and fastening means for moving the disk into binding engagement with the head of one section to retain the sections against pivotal movement after being adjusted.

In testimony whereof I affix my signature in presence of two witnesses.

DAVID CABRERA LOPEZ.

Witnesses:
 ALBERT F. MILLER,
 ETHAN L. CLARK.